(12) United States Patent
Trottet et al.

(10) Patent No.: US 11,882,851 B2
(45) Date of Patent: Jan. 30, 2024

(54) PROCESS FOR PREPARING A MEAT-ANALOGUE FOOD PRODUCT

(71) Applicant: SOCIÉTÉ DES PRODUITS NESTLÉ S.A., Vevey (CH)

(72) Inventors: Gregory Trottet, Rennaz (CH); Sheldon Fernandes, Singen (DE); Gregor Grunz, Singen (DE); Johannes Peter Thoma, Winterthur (CH); Kirsten Brunner-Komorek, Henggart (CH)

(73) Assignee: Societe des Produits Nestle S.A., Vevey (CH)

( * ) Notice: Subject to any disclaimer, the term of this patent is extended or adjusted under 35 U.S.C. 154(b) by 414 days.

(21) Appl. No.: 15/558,344

(22) PCT Filed: Mar. 18, 2016

(86) PCT No.: PCT/EP2016/055910
§ 371 (c)(1),
(2) Date: Sep. 14, 2017

(87) PCT Pub. No.: WO2016/150834
PCT Pub. Date: Sep. 29, 2016

(65) Prior Publication Data
US 2018/0064137 A1    Mar. 8, 2018

(30) Foreign Application Priority Data

Mar. 20, 2015 (EP) .................... 15160090

(51) Int. Cl.
*A23J 3/26* (2006.01)
*A23J 3/16* (2006.01)
(Continued)

(52) U.S. Cl.
CPC . *A23J 3/26* (2013.01); *A23J 3/14* (2013.01); *A23J 3/16* (2013.01); *A23J 3/18* (2013.01);
(Continued)

(58) Field of Classification Search
None
See application file for complete search history.

(56) References Cited

U.S. PATENT DOCUMENTS

2012/0093994 A1    4/2012  Hsieh et al.
2015/0044334 A1    2/2015  Walther et al.

FOREIGN PATENT DOCUMENTS

WO         03007729         1/2003
WO     2010126563  A1     11/2010
(Continued)

OTHER PUBLICATIONS

Liu et al. "Development of a new meat analog through twin-screw extrusion of defatted soy flour-lean pork blend" Abstract—Biosciences Information Service, Dec. 2005, 1 page, XP002741020.
(Continued)

*Primary Examiner* — Elizabeth Gwartney
(74) *Attorney, Agent, or Firm* — K&L Gates LLP

(57) ABSTRACT

The invention relates to a process for preparing a meat-analogue food product. More specifically, the present invention relates to a process for preparing a meat-analogue food product having the appearance and the texture of meat and also relates to a meat-analogue food product obtained by the process.

20 Claims, 1 Drawing Sheet

(51) Int. Cl.
*A23J 3/18* (2006.01)
*A23J 3/22* (2006.01)
*A23P 30/20* (2016.01)
*A23J 3/14* (2006.01)
*A23L 27/00* (2016.01)
*A23L 29/00* (2016.01)
*A23L 29/212* (2016.01)

(52) U.S. Cl.
CPC ............... *A23J 3/227* (2013.01); *A23L 27/00* (2016.08); *A23L 29/04* (2016.08); *A23L 29/212* (2016.08); *A23P 30/20* (2016.08)

(56) References Cited

FOREIGN PATENT DOCUMENTS

| WO | 2012158023 | 11/2012 |
|---|---|---|
| WO | 2012163836 | 12/2012 |
| WO | 2014081285 | 5/2014 |

OTHER PUBLICATIONS

Patentee Submission for EP3270716, Nov. 1, 2019, pp. 1-5.
Riaz, "Extruders in Food Applications", 2000, pp. 12, 17, 81-114, and 127-137.
Moscicki, "Extrusion-Cooking Techniques", 2011, pp. 17, 20-21, 23, 72, 95, 134 and 135.
Application as filed from EPO file for EP3270716—Description, pp. 1-16.
Application as filed from EPO file for EP3270716—Claims, pp. 17-19.
European Patent Office Communication for Application No. 16714285.0-1105 / 3270716, dated Sep. 21, 2021, 13 pages.

Fig. 1: Dry mix and water are mixed before feeding the extruder barrel
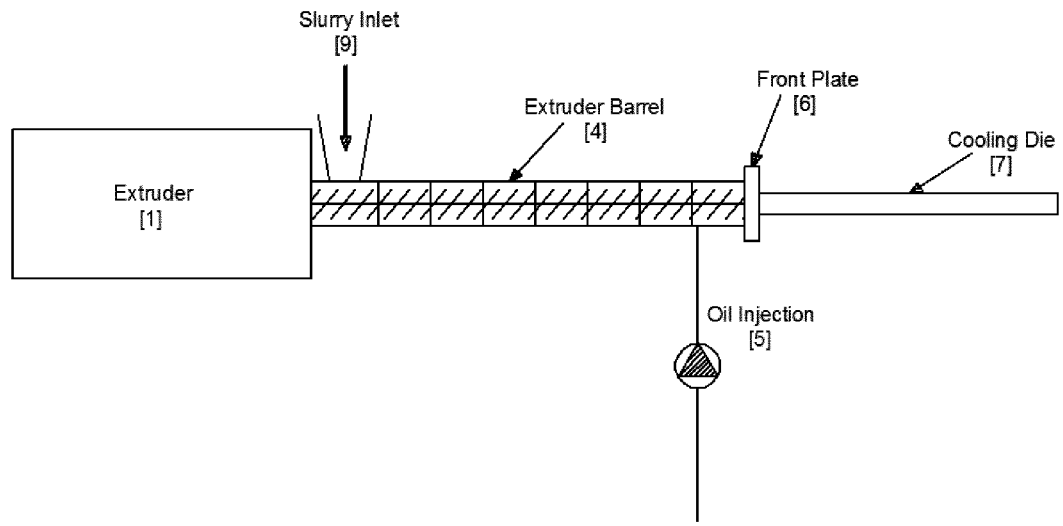
Fig. 2: Dry mix feeding and separately water and oil injection.
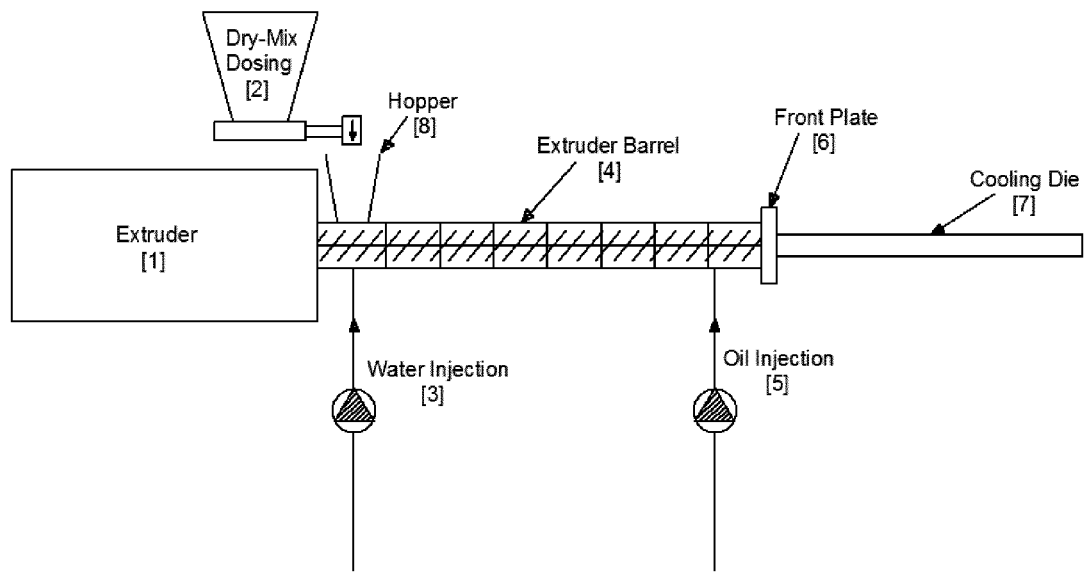

PROCESS FOR PREPARING A MEAT-ANALOGUE FOOD PRODUCT

CROSS REFERENCE TO RELATED APPLICATIONS

The present application is a National Stage of International Application No. PCT/EP2016/055910, filed on Mar. 18, 2016, which claims priority to European Patent Application No. 15160090.5, filed on Mar. 20, 2015, the entire contents of which are being incorporated herein by reference.

The invention relates generally to a process for preparing a meat-analogue food product. More specifically, the present invention relates to a process for preparing a meat-analogue food product having the appearance, texture and taste of meat and also relates to a meat-analogue food product obtained by the process.

One of the primary nutritional features of meat is its protein content. However, the production of meat is relatively inefficient in terms of feed input to food output. Accordingly, meat-analogue food products can achieve a desired protein content using inexpensive by-products from certain crops such as soybeans or wheat. Furthermore, some individuals abstain from the consumption of meat for any of a variety of reasons.

Nevertheless, many existing processes produce texturized meat-analogue food products that do not mimic the nutrition, texture, appearance and/or the taste of real meat products. As a result, consumers typically consider such meat-analogue food products to be unappealing and unpalatable.

WO 2003/007729 describes an extrusion process for preparing a retextured food product from a protein source (animal and/or plant origin). The fatty content of the product is achieved by mixing fatty ingredients with lecithins or caseinates together with the protein, fibers and starches and with a large amount of water before kneading the mixture to obtain a paste food that is subjected successively a heating, gelation and formatting steps. Nevertheless meat has a carbohydrate amount of 0 to 0.5 wt % and therefore meat-analogue compositions with high amounts of carbohydrates such as starches are not perceived as having a nutritional value of meat. Additional higher amounts of carbohydrates such as starches have a negative perceived mouth feeling by the consumers. Furthermore, they are perceived to have a cereal taste and aroma, which is not pleasant.

WO 2012/158023 describes an extrusion process for turning vegetable protein compositions such as soy protein into a fibrous, meat-like structure. The process describes that the extrusion exit temperature is above the boiling point of water and this results in an open structure that can be infused with an infusion liquid to reach a desirable fat content. This infusion technology nevertheless means an additional process step and the product might perceived as too fatty by the consumers.

There is a persisting need for a process of preparing a meat-analogue food product having the appearance, texture and taste of meat. Further there is a need to produce a meat-analogue food product having the appearance, texture and taste of meat with a desired amount of oil, fat or a combination thereof in the resulting composition. Unfortunately the addition of oil and/or fat to an extruder expanded meat-analogue food product is fraught with difficulties. With higher amount of oil and/or fat it is difficult to reach a product which has the texture of meat. The mechanical shear forces normally obtained with an extruder to build up the needed fiber structure of a meat-analogue, are reduced by the addition of oil and/or fat in the starting composition; or have to be blended by higher amounts of starch and/or flours; or the desired fat content has to be achieved with an additional step after extrusion as described with the infusion technology above.

The object of the present invention is to improve the state of the art and to provide a process for preparing a meat-analogue food product that at least goes part way to overcome one or more of the above mentioned disadvantages of existing processes or at least provides a useful alternative. Particularly, the objective is to provide a process for preparing a meat-analogue food product: i) a meat-analogue food product having the appearance, texture and taste of meat;
ii) a meat-analogue food product having the appearance, texture and taste of meat and having oil, fat or a combination thereof in the resulting composition; iii) a meat-analogue food product having the appearance, texture and taste of meat, having oil, fat or a combination thereof in the resulting composition using starch and/or flour in a low amount; iv) a meat-analogue food product having the appearance, texture and taste of meat, having oil, fat or a combination thereof in the resulting composition without using starch and flour; v) a meat-analogue food product having a strong bite/mouth feel that is not pasty, mushy, rubbery or brittle; vi) to allow product nutritional profiles to be tailored to different market segments; vii) a meat-analogue food product for the vegetarian and health food markets; vii) a meat-analogue food product having improved textural attributes; viii) a meat-analogue food product that has greater appeal for consumers; ix) having a process using a high extruder shear force and having a high oil and/or fat content in the final product; x) a meat-analogue food product wherein the meat-analogue food product does not comprise protein from an animal source The object of the present invention is achieved by the subject matter of the independent claims. The dependent claims further develop the idea of the present invention.

Accordingly, the present invention provides in a first aspect a process for preparing a meat-analogue food product, the process comprising the steps of:
  a) feeding an extruder barrel (4) with 40-70 wt % water and 15-35 wt % plant protein;
  b) injecting 2-15 wt %, preferably 2-10 wt %, liquid oil, fat or a combination thereof into the extruder barrel (4) at a location down-stream of the feeding location of step a);
  c) extruding the mixture through a cooling die (7).

In a second aspect, the invention pertains to a meat-analogue food product obtainable by the process comprising the steps of:
  a) feeding an extruder barrel (4) with 40-70 wt % water and 15-35 wt % plant protein;
  b) injecting 2-15 wt %, preferably 2-10 wt %, liquid oil, fat or a combination thereof into the extruder barrel (4) at a location down-stream of the feeding location of step a);
  c) extruding the mixture through a cooling die (7);

It has now been found by the inventors that injecting oil (5) into the extruder barrel (4) at a location down-stream of the feeding location of the plant protein and water has certain desirable and surprising characteristics. The process of the present disclosure allows the continuous production of a meat-analogue food product that has the resemblance of real meat using extrusion technology. The process allows having oil, fat or a combination thereof in the resulting composition. The texturized products produced from these processes can be further enhanced by adding flavouring systems, fillers, colouring, and/or texturization agent and can be fortified to improve the nutritional value of the product. It results in a meat-analogue food product having the appearance, texture and taste of meat and having 2-15 wt % of oil, fat or a combination thereof in the meat-analogue food product.

BRIEF DESCRIPTION OF THE DRAWINGS

FIG. 1 shows a process where dry mix and water are mixed before feeding into the extruder barrel.

FIG. 2 shows a process where dry mix feeding, water injection, and oil injection into the extruder barrel are all conducted separately.

Through the oil injection down-stream of the feeding location of the plant protein and water high shear within the extruder barrel is resulting in a better texturized product. It further reduces the need to use starch and/or flour. In a meat-analogue food product high amount of starch and/or flour are perceived with a negative mouth feeling and a cereal taste and aroma which are not pleasant for the consumer.

All percentages expressed herein are by weight of the total weight of the meat-analog food product unless expressed otherwise.

The terms "food," "food product" and "food composition" mean a product or composition that is intended for ingestion by an animal, including a human, and provides at least one nutrient to the animal or human. The present disclosure is not limited to a specific animal.

A "meat-analogue" is also called a meat alternative, meat substitute, mock meat, faux meat, imitation meat, or (where applicable) vegetarian meat or vegan meat. Meat analogue is understood to mean a food made from non-meats, without other animal products, such as dairy. Therefore protein from animal source is completely absent. Protein from animal source is animal meat protein and/or milk protein. A meat-analogue food product is a composition in which meat (i.e. skeletal tissue and non-skeletal muscle from mammals, fish and fowl) and meat by-products (i.e. the non-rendered clean parts, other than meat, derived from slaughtered mammals, fowl or fish) are completely absent. The market for meat imitations includes vegetarians, vegans, non-vegetarians seeking to reduce their meat consumption for health or ethical reasons, and people following religious dietary laws.

"Extrusion" is a process used to create objects of a fixed cross-sectional profile. A material is pushed or pulled through a die of the desired cross-section. The two main advantages of this process over other manufacturing processes are its ability to create very complex cross-sections, and to prepare products that are brittle, because the material only encounters compressive and shear stresses. High-moisture extrusion is known as wet extrusion. Extruders typically comprise an extruder barrel within which rotates a close fitting screw. The screw is made up of screw elements, some of which are helical screw threads to move material through the extruder barrel. Material is introduced into the extruder barrel toward one end, moved along the extruder barrel by the action of the screw and is forced out of the extruder barrel through a nozzle or die at the other end. The rotating screw mixes and works the material in the barrel and compresses it to force it through the die or nozzle. The degree of mixing and work to which the material is subjected, the speed of movement of the material through the extruder barrel and thus the residence time in the extruder barrel and the pressure developed in the extruder barrel can be controlled by the pitch of the screw thread elements, the speed of rotation of the screw and the rate of introduction of material into the extruder barrel. The extruder barrel comprises multiple extruder barrel sections which are joined end to end. Multiple extruder barrel sections are required to carry out different processes involved in extrusion such as conveying, kneading, mixing, devolatilizing, metering and the like. Each extruder barrel section comprises a liner which is press fit into an extruder barrel casing, and heating and cooling elements are provided to regulate temperature of extruder barrel section within permissible range. The total length of an extrusion process can be defined by its modular extrusion barrel length. An extruder barrel is described by its unit of diameter. A "cooling die" is cooling the extruded product to a desired temperature.

BRIEF DESCRIPTION OF THE FIGURES

As generally illustrated in FIG. 1, the present disclosure provides a process for producing meat-analogue food product. The process can comprise a) feeding an extruder barrel (4) with 20-45 wt % plant protein and 50-70 wt % water; b) injecting 2-15 wt % liquid oil, fat or a combination thereof into the extruder barrel (4) at a location down-stream of the feeding location of step a); extruding the mixture through a cooling die (7).

Further ingredients selected from flavouring, filler and/or optionally fortification compounds can be added to plant protein when feeding the extruder in step a).

In a further embodiment Water might be mixed to a dry plant protein before feeding the extruder barrels through a slurry inlet (9).

In a further embodiment plant protein in the form of a dry powder is added to the extruder barrel (4) and water is injected (3) separately. The mixing of the dry plant protein and water is done within the extruder barrel through the mechanical energy forced. Therefore it is not necessary to form a dough of the plant protein and water before feeding the extruder barrel.

The location of injecting the liquid oil or fat (5) is at a location down-stream of the feeding location of the plant protein, preferably within the second half part of the total length of the extruder barrel (4), preferably within the last third part of the total length of the extruder barrel, preferably within the last quarter part of the total length of the extruder barrel, preferably within the last sixth part of the total length of the extruder barrel, preferably within the last screw element of the extruder barrel.

The term "plant protein" includes "plant protein isolates" or "plant protein concentrates" or combination thereof. The person skilled in the art knows how to calculate the amount of plant protein within a plant protein concentrate or plant protein isolate.

The term "plant protein concentrate" as used herein is a plant material having a protein content of from about 65% to less than about 90% plant protein on a moisture-free basis. Plant protein concentrate also contains plant fiber, typically from about 3.5% up to about 20% by weight on a moisture-free basis.

The term plant protein isolate as used herein is a plant material having a protein content of at least about 90% plant protein on a moisture free basis.

Plant protein include plant protein concentrate or plant protein isolate from pea protein, corn protein (e.g., ground corn or corn gluten), wheat protein (e.g., ground wheat or wheat gluten such as vital wheat gluten), potato protein, legume protein such as soy protein (e.g., soybean meal, soy concentrate, or soy isolate), rice protein (e.g., ground rice or rice gluten), barley protein, algae protein, canola protein or combinations thereof. Preferably the plant protein is wheat gluten, more preferably the plant protein is a mix from soy protein and wheat gluten, more preferably the plant protein is soy protein.

In a further embodiment, the meat-analogue food product of the invention comprises plant protein in the amount of 15-35 wt %, preferably 17-32 wt %, preferably 17-30 wt %, preferably 17-28 wt %, preferably 18-24 wt %.

In a further embodiment, the meat-analogue food product of the invention comprises soy protein in the amount of 15-35 wt %, preferably 17-32 wt %, preferably 17-30 wt %, preferably 17-28 wt %, preferably 18-25 wt %.

In a further embodiment, the meat-analogue food product of the invention comprises soy protein and wheat gluten in the amount of 15-35 wt %, preferably 17-32 wt %, preferably 17-30 wt %, preferably 17-28 wt %, preferably 18-25 wt %.

In a further embodiment, the meat-analogue food product of the invention comprises water in the amount of 40-70 wt %, preferably 45-70 wt %, preferably 45-65 wt %, preferably 50-70 wt %, preferably 50-65 wt %, preferably 55-65 wt %.

The term liquid oil, fat or combination thereof include soybean oil, corn oil, sunflower oil, high oleic sunflower oil, olive oil, canola oil, safflower oil, peanut oil, palm oil, cottonseed oil, coconut oil, almond oil, hazelnut oil, rape seed oil, fractionated palm fat, fully or partially hydrogenated or inter-esterified palm oil and combinations thereof. Preferably the liquid oil is sunflower oil. In a further embodiment, meat-analogue food product comprises the oil and/or fat in an amount of 2-15 wt %, preferably 2.5-15 wt %, preferably 2-10 wt %, preferably 2.5-10 wt %, preferably 2-8 wt %, preferably 2.5-8 wt %, more preferably 2-5 wt %; more preferably 2.5-5 wt %. In a further embodiment, meat-analogue food product comprises sunflower oil in an amount of 2-15 wt %, preferably 2.5-15 wt %, preferably 2-10 wt %, preferably 2.5-10 wt %, preferably 2-8 wt %, preferably 2.5-8 wt %, more preferably 2-5 wt %; more preferably 2.5-5 wt %.

The term "flavouring" in the context of this invention includes salt, flavouring agents, acids, taste enhancing ingredients, herbs, spices, vegetables or mixtures thereof, which are suitable for being used in a food product. Taste enhancing ingredients may be provided by monosodium glutamate (MSG) and/or yeast extract etc. Salt refers to any suitable alkali metal salt or mixture thereof. The salt used in the composition of this invention is typically, but not limited to, sodium chloride. For example, potassium chloride may be used or any low-sodium product having a taste impression of sodium chloride may be used, as long as the taste in the end formulation is acceptable. Acids may be provided by vinegar, lactic acid, citric acid or combination thereof.

In a further embodiment, the meat-analogue food product of the invention comprises flavouring in the amount of 0.5-20 wt %, preferably 0.5-15 wt %, preferably 0.5-10 wt %, preferably 2-10 wt %, preferably 2-8 wt %, preferably 3-8 wt %.

The term "filler" in the content of this invention includes carbohydrates. Carbohydrates may be provided by starches, flours, sugars, maltodextrins, glucose syrups etc., preferably maltodextrin. Starches and/or flours include those from rice, wheat, corn, barley, and sorghum, potato, cassava, sweet potato, arrowroot, yam, pea, chickpea, mung beans or lentil or any combination thereof.

In a further embodiment, the meat-analogue food product of the invention comprises fillers in the range 0.5 to 10 wt %, 0.5-8 wt %, preferably 0.5-7 wt %, preferably 1-10 wt %, preferably 1-8 wt %, preferably 1-7 wt %, preferably 2-7 wt %, preferably 0.5-6 wt %, preferably 0.5-5 wt %, preferably 0.5-4 wt %, preferably 0.5-3 wt %.

In a further embodiment, the meat-analogue food product of the invention comprises starch and/or flour in the range 0-7 wt %, preferably 0-6 wt %, preferably 0-5 wt %, preferably 0-4 wt %, preferably 0-3 wt %, preferably 0.5-7 wt %, preferably 0.5-6 wt %, preferably 0.5-5 wt %, preferably 0.5-4 wt %, preferably 0.5-3 wt %, preferably 1-7 wt %, preferably 1-8 wt %, preferably 1-6 wt %, preferably 1-5 wt %.

The dry ingredients can also comprise one or more fortification compounds as vitamins, minerals and iron salts. The term vitamins include Vitamins A, B-complex (such as B-1, B-2, B-6 and B-12), C, D, E and K, niacin, and acid vitamins such as pantothenic acid, folic acid and biotin, preferably vitamin B-12. The term minerals include calcium, iron, zinc, magnesium, iodine, copper, phosphorus, manganese, potassium, chromium, molybdenum, selenium, nickel, tin, silicon or vanadium. The term iron salts include ferric sodium EDTA, reduced iron, ferrous lactate, ferric citrate, ferric pyrophosphate, ferrous sulphate monohydrate or ferric ammonium citrate brown, preferably ferric pyrophosphate.

Specific amounts of fortification compounds will depend on a variety of factors such as the identity of the ingredient; the species of animal; the animal's age, body weight, general health, sex, and diet; the animal's consumption rate; the purpose for which the food product is administered to the animal; and the like. Therefore, the components and their amounts may vary widely.

The dry ingredients can also comprise one or more colours. The term colours include FD&C colors, such as blue no. 1, blue no. 2, green no. 3, red no. 3, red no. 40, yellow no. 5, yellow no. 6, and the like; natural colors, such as caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan.

In a further embodiment, a Meat-analogue food product is obtained by a process described within this invention which comprises 45-65 wt % water, 18-24 wt % plant protein and 2-5 wt % of liquid oil.

Referring again to FIG. 1, in case the plant protein is mixed with water before feeding the extruder barrel, the non-meat dough can be transferred, for example by pumping, from the mixing device. In an embodiment, the non-meat dough is transferred directly from the mixing device to the extruder barrel without any other processing or addition or removal of ingredients.

Referring again to FIG. 2, in case the plant protein is added as dry mix (2) to the extruder barrel (4), a hopper (8) might be used. Water is added separately (3) to the extruder barrel (4).

The extruder barrels are heated to a temperature of between 70 to 180° C., preferably 80 to 180° C., preferably 80-150° C. The pressure on the front plate (6) is between 10 to 20 bar, preferably 15 bar. The screw speed is around 200-400 rpm.

During the cooling within the cooling die (7) both the temperature and the pressure are gradually reduced as the heated non-meat dough travels through the cooling device. The dough has moisture and is under elevated temperature, so preferably moisture flashing is controlled to avoid rapid expansion of the food product. Product expansion that is too rapid can disrupt the structure of the texturized food product. However, depending on the desired image of the final food product, some flashing may be required to reduce the temperature of the centre of the food product and/or to expose some of the fibers in the food product. In an embodiment, the non-meat dough undergoes a decrease in pressure at a predetermine rate in the cooling device and/or is subjected to a predetermined final pressure at the end of the cooling device. The meat-analogue food product has an exit temperature at the end of the cooling die (7) between 40-100° C., preferably between 50-100° C., preferably between 50-95° C., preferably between 50-90° C.

As used in this specification, the words "comprises", "comprising", and similar words, are not to be interpreted in an exclusive or exhaustive sense. In other words, they are intended to mean "including, but not limited to".

Those skilled in the art will understand that they can freely combine all features of the present invention disclosed herein. In particular, features described for the composition of the present invention may be combined with the process for the preparation of the composition, and vice versa. Further, features described for different embodiments of the present invention may be combined. Further advantages and features of the present invention are apparent from the examples.

EXAMPLES

The invention is further described with reference to the following examples. It will be appreciated that the invention as claimed is not intended to be limited in any way by these examples.

The examples are describing the preparation of a meat-analogue food product by the process of this invention. A dry mix of the plant protein was added through a hopper (8) into the extruder barrel (4) and water is separately injected (3) at room temperature. The extruder barrel (4) is heated within a curve between 80-150° C. Oil is injected (5) within this temperature range within the last quarter of the total length of the extruder barrel (4). The cooling die (7) is cooling the product to an exit temperature of 70° C. The product was made on a Bühler BCTL-42 twin screw extruder from the following materials:

Example 1

| Ingredient | % (w/w) |
| --- | --- |
| Water | 50 |
| Wheat Gluten Protein concentrate | 34 |
| Maltodextrin | 3 |
| Plant oil | 4 |
| Starch or Flour | 4 |
| Flavouring | 5 |
| Total Protein content from concentrate | 27 |

Example 2

| Ingredient | % (w/w) |
| --- | --- |
| Water | 63 |
| Soy Protein concentrate | 25 |
| Wheat Gluten Protein concentrate | 5 |
| Plant oil | 4 |
| Starch or Flour | 0 |
| Flavouring | 3 |
| Total Protein content from concentrate | 21 |

Example 3

| Ingredient | % (w/w) |
| --- | --- |
| Water | 63 |
| Soy Protein concentrate | 30 |
| Plant oil | 4 |
| Starch or Flour | 0 |
| Flavouring | 3 |
| Total Protein content from concentrate | 21 |

Example 4

| Ingredient | % (w/w) |
| --- | --- |
| Water | 51 |
| Soy Protein concentrate | 35 |
| Maltodextrin | 1.5 |
| Plant oil | 8 |
| Starch or Flour | 0 |
| Flavouring | 4.5 |
| Protein content from concentrate | 25 |

Example 5

| Ingredient | % (w/w) |
| --- | --- |
| Water | 61 |
| Soy Protein concentrate | 31 |
| Plant oil | 4 |
| Starch or Flour | 0 |
| Flavouring | 4 |
| Total Protein content from concentrate | 21 |

The resulted non-meat analogues from example 1 to 5 have the appearance, texture and taste of meat. In a trained panel of 150 person the resulted products from example 2 to 5 have been found be less fatty and be less moist by the appearance and to be less rubbery by the texture compared to a commercial product which is described in WO 2012/158023. Examples 1-5 leading to a preferred product for the consumer are obtained by the process of the invention using a simplified process by avoiding additional process steps e.g. as "infusion" (described within WO 2012/158023).

The invention claimed is:

1. A process for preparing a meat-analogue food product, the process comprising:
   a) feeding a section of an extruder barrel with a composition comprising 0-4 wt % starch and/or flour, 40-70 wt % water and 15-35 wt % plant protein based on the weight of the meat-analogue food product, wherein a screw rotates within at least the section of the extruder barrel that is fed the composition;

b) injecting 2-15 wt % liquid oil, fat or a combination thereof based on the weight of the meat-analogue food product into the extruder barrel at a location downstream of the section of the extruder barrel that is fed the composition and wherein the liquid oil, fat or a combination thereof is injected into a section of the extruder barrel where the screw rotates; and c) extruding the mixture through a cooling die.

2. The process for preparing a meat-analogue food product according to claim 1, wherein the meat-analogue food product does not comprise protein from an animal source.

3. The process for preparing a meat-analogue food product according to claim 1, comprising feeding the section of the extruder barrel with flavoring and/or filler.

4. The process for preparing a meat-analogue food product according to claim 3, wherein the amount of flavoring is in the range of 0.5 to 15 wt % based on the weight of the meat-analogue food product.

5. The process for preparing a meat-analogue food product according to claim 3, wherein the amount of filler is in the range of 0.5 to 15 wt % based on the weight of the meat-analogue food product.

6. The process for preparing a meat-analogue food product according to claim 1, wherein the plant protein is mixed with the water before feeding the section of the extruder barrel.

7. The process for preparing a meat-analogue food product according to claim 1, wherein the plant protein is added to the section of the extruder barrel in the form of a dry powder, and the water is injected separately into the section of the extruder barrel.

8. The process for preparing a meat-analogue food product according to claim 1, wherein the location of injecting the liquid oil, fat or combination thereof is within the second half part of the total length of the extruder barrel.

9. The process for preparing a meat-analogue food product according to claim 1, wherein the plant protein is selected from the group consisting of soy protein, wheat gluten, and combinations thereof.

10. The process for preparing a meat-analogue food product according to claim 1, wherein the liquid oil is sunflower oil.

11. The process for preparing a meat-analogue food product according to claim 1, wherein the extruder barrel is heated to a temperature between 80-180° C.

12. The process for preparing a meat-analogue food product according to claim 1, wherein the meat-analogue food product has an exit temperature at the end of the cooling die between 50-90° C.

13. A meat-analogue food product obtainable by the process of claim 1.

14. The meat-analogue food product according to claim 13, comprising 35-65 wt % water, 15-35 wt % plant protein and 2-15 wt % of liquid oil, fat or combinations thereof based on the weight of the meat-analogue food product.

15. The process for preparing a meat-analogue food product according to claim 1, wherein the liquid oil, fat or a combination thereof is in an amount of 2.5-15 wt % based on the weight of the meat-analogue food product.

16. The process for preparing a meat-analogue food product according to claim 1, wherein the liquid oil, fat or a combination thereof is in an amount of 2.5-10 wt % based on the weight of the meat-analogue food product.

17. The process for preparing a meat-analogue food product according to claim 1, wherein the liquid oil, fat or a combination thereof is in an amount of 2.5-5 wt % based on the weight of the meat-analogue food product.

18. The process for preparing a meat-analogue food product according to claim 1, wherein the meat-analogue food product does not have any starch and does not have any flour.

19. The process for preparing a meat-analogue food product according to claim 1, wherein the meat-analogue food product further comprises at least one of vitamins, minerals and iron salts.

20. A process for preparing a meat-analogue food product, the process comprising:
a) feeding a section of an extruder barrel with a composition comprising 40-70 wt % water, 15-35 wt % plant protein, and 0.5 to 15 wt % flavouring based on the weight of the meat-analogue food product, wherein a screw rotates within at least the section of the extruder barrel that is fed the composition, wherein the extruder barrel is heated to a temperature between 80-180° C., wherein the plant protein is selected from the group consisting of soy protein, wheat gluten, and combinations thereof, wherein the feeding of the section of the extruder barrel with the composition comprises adding the plant protein to the section of the extruder barrel in the form of a dry powder while injecting the water separately into the section of the extruder barrel;
b) injecting 2-15 wt % liquid oil, fat or a combination thereof based on the weight of the meat-analogue food product into the extruder barrel at a location downstream of the section of the extruder barrel that is fed the composition and wherein the location of the injecting the liquid oil, fat or combination thereof is within the last quarter part of the total length of the extruder barrel in which the screw rotates; and
c) extruding the mixture through a cooling die, wherein the meat-analogue food product has an exit temperature at the end of the cooling die between 50-90° C., wherein the meat-analogue food product does not comprise protein from an animal source, does not have any starch and does not have any flour, wherein the meat-analogue food product further comprises at least one of a filler, a vitamin, a mineral or an iron salt.

* * * * *